(12) United States Patent
Das et al.

(10) Patent No.: US 7,054,872 B1
(45) Date of Patent: May 30, 2006

(54) ONLINE TRACKING AND FIXING OF INVALID GUESS-DBAS IN SECONDARY INDEXES AND MAPPING TABLES ON PRIMARY B+TREE STRUCTURES

(75) Inventors: Souripriya Das, Nashua, NH (US); Aravind Yalamanchi, Nashua, NH (US); Eugene I. Chong, Concord, MA (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 932 days.

(21) Appl. No.: 09/865,598

(22) Filed: May 29, 2001

(51) Int. Cl.
*G06F 17/30* (2006.01)

(52) U.S. Cl. ....................................................... 707/100
(58) Field of Classification Search ................ 707/3, 707/100, 200
See application file for complete search history.

(56) References Cited

U.S. PATENT DOCUMENTS

| | | | | |
|---|---|---|---|---|
| 4,611,272 A | * | 9/1986 | Lomet | 707/3 |
| 5,363,098 A | | 11/1994 | Antoshenkov | 341/95 |
| 5,440,732 A | * | 8/1995 | Lomet et al. | 707/1 |
| 5,680,607 A | * | 10/1997 | Brueckheimer | 707/7 |
| 5,764,877 A | * | 6/1998 | Lomet et al. | 714/6 |
| 5,852,822 A | | 12/1998 | Srinivasan et al. | 707/4 |
| 5,893,104 A | | 4/1999 | Srinivasan et al. | 707/102 |
| 6,535,869 B1 | * | 3/2003 | Housel, III | 707/2 |
| 6,591,269 B1 | * | 7/2003 | Ponnekanti | 707/100 |

OTHER PUBLICATIONS

Spatial Quadtree Indexing, Oracle Spatial User's Guide and Reference for Oracle Release 8.1.6, Dec. 1999, p. 1–1–1–12.

* cited by examiner

*Primary Examiner*—Greta Robinson
(74) *Attorney, Agent, or Firm*—Swidler Berlin LLP

(57) ABSTRACT

A method for maintaining a system for database management. The method includes recording the addresses of newly created leaf blocks during a split operation on a primary B+tree and maintaining the new addresses in a list as part of primary B+tree metadata.

73 Claims, 1 Drawing Sheet

ONLINE TRACKING AND FIXING OF INVALID GUESS-DBAS IN SECONDARY INDEXES AND MAPPING TABLES ON PRIMARY B+TREE STRUCTURES

FIELD OF THE INVENTION

The present invention relates to organizing and accessing data in a database using database indexes. In particular, the present invention relates to auxiliary structures such as mapping tables and secondary index structures for indexing tables stored as primary B+trees. More particularly, the present invention relates to methods and structures for efficient maintenance of mapping tables and secondary index structures for a primary B+tree structure as the primary B+tree structure is updated.

BACKGROUND OF THE INVENTION

In a typical relational database system, users store, update, and retrieve information by interacting with user applications. The applications respond to a user's interaction by submitting commands to a database application, or server, responsible for maintaining the database. The database server responds to commands by performing the specified actions on the database. To be correctly processed, the commands must comply with the database language that the database server supports. One popular database language is commonly known as Structured Query Language (SQL).

Various access methods may be utilized to retrieve data from a database. The access methods used to retrieve data may significantly affect the speed of the retrieval and the amount of resources consumed during the retrieval process. Many information retrieval applications make use of indices when performing content-based searches on the database data. Examples of database indices include R-trees, quadtrees, and B-trees.

Database indices provide organization and reference to the data in a database to permit a user to find particular items of data in the database or determine relationships among the data in the database. Database indices can also permit relationships between the data in a database and data not included in the database to be determined. For example, an index can make it possible to determine location within a certain distance of a location defined in a database comprised of geographical location information.

SUMMARY OF THE INVENTION

The present invention addresses problems associated with block addresses stored in secondary indexes and/or mapping tables for a primary B+tree structure becoming stale due to row movement in the primary B+tree structure caused by leaf block splits. No known solution exists for addressing the problems that the present invention resolves.

The present invention provides a method for maintaining a system for database management. The method includes recording an address of a newly created block resulting from splitting of a leaf block of a primary B+tree and maintaining the address in a list as part of primary B+tree metadata.

Additionally, the present invention concerns a system for organizing a database index. The system includes a list as part of primary B+tree metadata. The list maintains addresses of newly created leaf blocks during split operation of the primary B+tree.

Also, the present invention relates to a computer program product for performing a process for maintaining a database management system. The computer program product includes a computer readable medium and computer program instructions recorded on the computer readable medium and executable by a processor. The computer program instructions perform steps including recording a new address for a newly created block during splitting of a leaf block of a database and maintaining the new address in a list as part of primary B+tree metadata.

Furthermore, the present invention provides a system for performing a process for maintaining a database management system. The system includes a processor that is operable to execute computer program instructions. The system also includes a memory operable to store computer program instructions executable by the processor. The computer program instructions perform steps including recording a new address for a newly created block during splitting of a leaf block of a database and maintaining the new address in a list as part of primary B+tree metadata.

Still other objects and advantages of the present invention will become readily apparent by those skilled in the art from a review of the following detailed description. The detailed description below shows and describes preferred embodiments of the present invention, simply by way of illustration of the best mode contemplated of carrying out the present invention. As will be realized, the invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1:
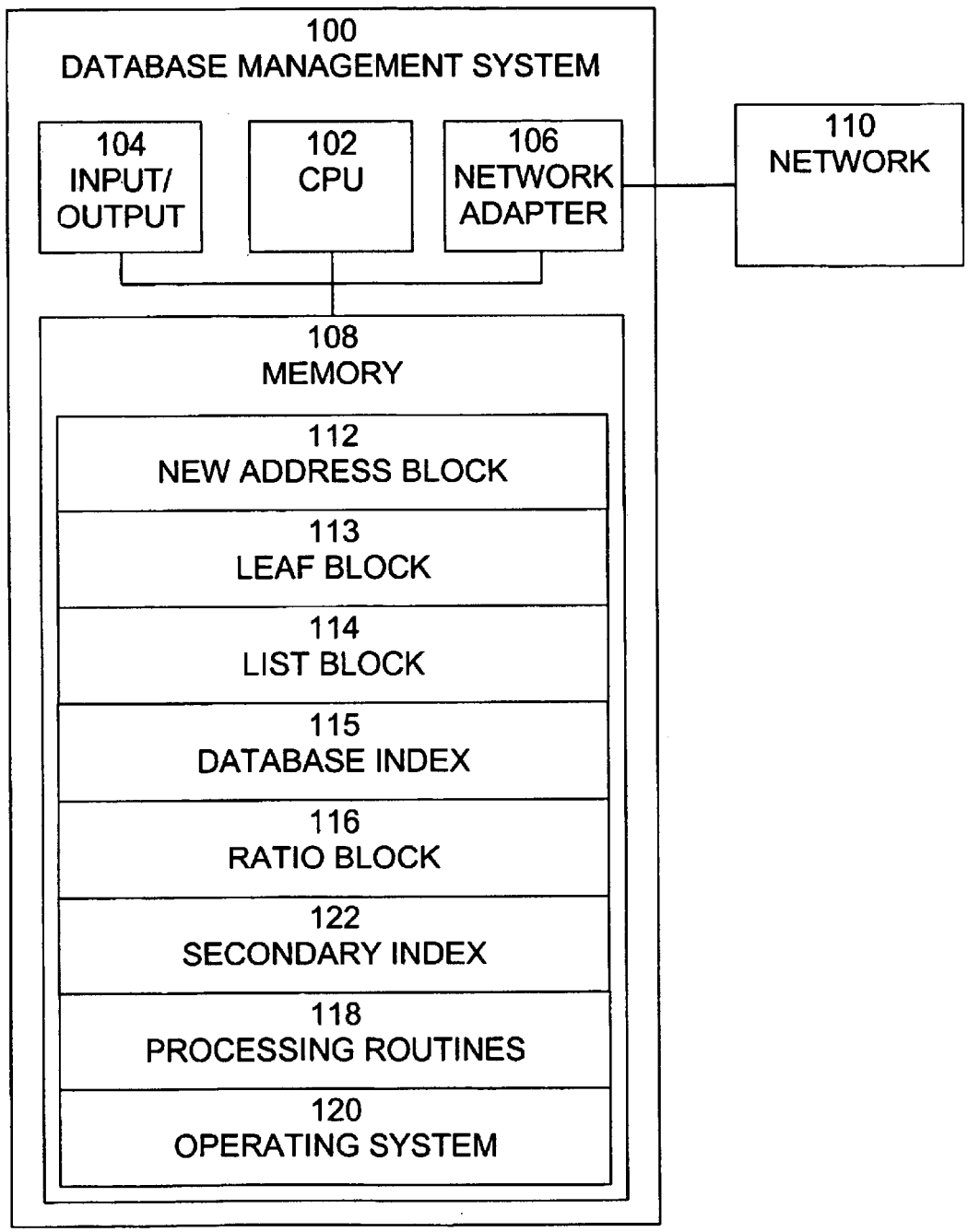
FIG. 1 represents a block diagram of an embodiment of a database management system according to the present invention.

For the primary B+-tree structures, an additional mapping table can be created as described in a U.S. patent application Ser. No. 09/867,678 filed on even date herewith for "Mapping Logical Row Identifiers For Primary B+Tree-Like Structures To Physical Row Identifiers", to Chong et al., and having, to supporting bitmap indexes, which are described in a U.S. patent application Ser. No. 09/865,599 now abandoned filed on even date herewith for "Supporting Bitmap Indexes on Primary B+tree Structures", to Chong et al., and having, the entire contents of the disclosures of both of which are hereby incorporated by reference. Also, bitmap indexes are described in greater detail in U.S. Pat. No. 5,363,098, for "Byte Aligned Data Compression", issued Nov. 8, 1994, to Antoshenkov, the entire contents of the disclosure of which are hereby incorporated by reference. Additionally or alternatively, secondary indexes can be created with logical row identifiers as described in U.S. patent application Ser. No. 09/473,073, now U.S. Pat. No. 6,546,394 to Chong et al., filed Dec. 28, 1999, for "Database System Having Logical Row Identifiers", the entire contents of the disclosure of which is hereby incorporated by reference. Both mapping tables, which may be utilized for supporting bitmap indexes, and secondary indexes store physical data block address to speed up query performance.

However, database block addresses (DBA), referred to as guess-DBAs, which may be stored in the mapping table, and secondary indexes can become stale due to movement of primary B+tree rows caused by leaf block splits. Prior to the present invention, the degree of staleness was not reflected in the guess-DBA quality statistics. Also, fixing invalid guess-DBAs in these structures involved doing a full sweep of the structure even if only a small portion of guess-DBAs had gone stale.

The present invention addresses problems related to staleness of database block address stored in mapping tables and secondary index structures and/or any other index or structure that references a primary B+tree structure. Along these lines, according to the present invention, during a leaf block split the address or database block address of a new block into which some of the rows move may be recorded. The DBA of that block may be maintained in a list as part of primary B+tree metadata. Also, a count of DBAs in the list may be maintained.

In order to determine whether it is necessary to carry out the present invention, a measure of invalid guess-DBAs may be maintained. This ratio may be utilized to adjust the guess-DBA quality of mapping table and/or secondary indexes. According to one embodiment, the measure includes the ratio <count of DBAs>/<total # of leaf blocks> as a measure of invalid guess-DBAs in mapping table and/or secondary indexes. According to the present invention, the list of DBAs is maintained only when the ratio is less than a predetermined threshold, such as, for example, about 10%.

At the point the selected measure described above falls below the predetermined threshold, or any measure indicates that the quality of the mapping table, secondary index or other structure has fallen below a certain level, the present invention can include initiating operation, either explicitly by user or implicitly by the system, for revising the mapping table, secondary index and/or other structure. Typically, the revision includes a selective fix-up of corresponding mapping table and secondary index entries.

The following describes one embodiment for carrying out the revisions in a mapping table. For all rows in the list of blocks, to fix mapping table entries, the values for the following elements may be retrieved from the primary B+tree: corresponding mapping table row identifiers and the DBA of the current block in the list. Next, these values may be sorted in the order of mapping table row identifiers. Then, mapping table rows corresponding to the mapping table row identifiers may be retrieved and its guess-DBA component is updated, if it differs from the current DBA.

In the context of a secondary index 122, shown in FIG. 1, entries in the index may be updated as described below. For all rows in the list of blocks, to fix secondary index entries, the values for the following elements may be retrieved from the primary B+tree: a secondary index key, a primary key, and a DBA of the current block in the list. Then, the values may be sorted in order of the (secondary index key, primary key) pairs. Next, an index row corresponding to the (secondary index key, primary key) pair may be retrieved and its guess-DBA component is updated if it differs from the current DBA. The secondary index structure may include hybrid row identifiers.

The updating of a mapping table and/or a secondary index structure may be carried out on-line. Alternatively, the updating may be carried out off-line. Regardless of when the updates are carried out, they may be carried out in a piece-wise manner, particularly when only the guess-DBA is being updated. Similarly, regardless of when the updating occurs, the updates may be committed in batches.

The above discussion of updating relates to situations where the defined ratio falls below a threshold value. On the other hand if the measure is above a predetermined threshold, it may be desired to carry out other operations on guess-DBAs.

The following describes an embodiment of a process for resorting of guess-DBAs to a per object based fixing. For each mapping table or secondary index a full scan of the object may be performed. For each row of the mapping table or secondary index, the correct guess-DBA may be determined by traversing the primary B+tree structure only up to the penultimate level. Then, each row of the mapping table or secondary index may be updated with the correct guess-DBA. Subsequently, the correct guess-DBAs may be committed to the mapping table or secondary index in small batches.

To permit the above-described methods to be carried out, the present invention also includes a system for organizing databases. The system includes a list of addresses of block newly created during split operation on the primary B+tree. Typically, the auxiliary structures that benefit from this invention are a mapping table and/or a secondary structure. However, the present invention could be utilized with other structures. The system according to the present invention can also include a count of database block addresses in the list. Additionally, the system can also include a ratio of database block addresses to total number of leaf blocks as a measure of invalid guess-DBAs.

An exemplary block diagram of a database management system 100 according to the present invention is shown in FIG. 1. A database management system typically includes a programmed general-purpose computer system, such as a personal computer, workstation, server system, and mini-computer or mainframe computer. The embodiment of the database management system 100 shown in FIG. 1 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a mini-computer or mainframe computer processor.

Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces database management system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as new address block 112, leaf block 113, list block 114, database index 115, and ratio block 116, and a plurality of blocks of program instructions, such as processing routines 118 and operating system 120. New address block 112 stores a plurality of new addresses for rows split from a leaf block 113 that have been received by the database management system 100 as a database index 115 is modified. List block 114 stores a list of the new addresses as metadata for the database index 115. Ratio block 116 stores the ratio of database addresses to total number of leaf blocks 113 that may be used to evaluate invalid guess-DBAs. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for maintaining a system for database management, the method comprising:

during splitting of a leaf block of a database index recording an address of a newly created leaf block;

maintaining the address of the newly created leaf block in a list as part of metadata of a primary B+tree; and maintaining a measure of invalid guess-database block addresses by calculating a ratio of a count of database block addresses in the list of new addresses to a total number of leaf blocks of the primary B+tree.

2. The method according to claim 1, wherein the measure of invalid guess-database block addresses applies to mapping tables and secondary indexes on the primary B+tree.

3. The method according to claim 1, wherein the list of database block addresses and the ratio are maintained only when the ratio is less than a threshold value.

4. The method according to claim 3, wherein the threshold value for the ratio is about 10%.

5. The method according to claim 2, further comprising:

adjusting a guess-DBA quality of at least one of the mapping table and the secondary index utilizing the ratio.

6. The method according to claim 3, wherein if the ratio is below the threshold value the method further comprises:

selectively correcting entries in the mapping table and/or secondary index.

7. The method according to claim 6, wherein correcting entries in the mapping table comprises for all rows in a list of blocks in the primary B+tree:

obtaining corresponding mapping table row identifiers and database block addresses of a current block in the list;

sorting the corresponding mapping table row identifiers;

obtaining mapping table rows corresponding to the mapping table row identifiers; and updating a guess-DBA component if it has changed.

8. The method according to claim 7, wherein the correcting is carried out on-line in a piece-wise manner.

9. The method according to claim 3, wherein correcting entries in the secondary index comprises for all rows in a list of blocks in the primary B+tree:

obtaining a secondary index key, a primary key and a database block address of a current block in the list of blocks;

sorting the secondary index keys, primary keys and database addresses in order of (secondary index key, primary key) pairs;

obtaining an index row corresponding to the (secondary index key, primary key) pair; and updating a guess-DBA component of the index row if the guess-DBA has changed.

10. The method according to claim 9, wherein the correcting is carried out on-line in a piece-wise manner.

11. The method according to claim 3, wherein if the ratio is above the threshold value the method further comprises:

correcting guess-database addresses on a per object basis.

12. The method according to claim 11, wherein correcting guess-database block addresses on the mapping table comprises:

performing a full scan of the mapping table;

determining for each row of the mapping table a correct guess-database block address by traversing the primary B+tree up to a penultimate level;

updating each row of the mapping table with the correct guess-database block address; and committing the correct guess-database address to the mapping table in batches.

13. The method according to claim 11, wherein correcting guess-database block addresses on a per object basis comprises for each secondary index object:

performing a full scan of the secondary index object;

determining for each row of the secondary index a correct guess-database block address by traversing the primary B+tree up to a penultimate level;

updating each row of the secondary index with the correct guess-database block address; and committing the correct guess-database block address to the secondary index in batches.

14. The method according to claim 1, further comprising:

maintaining a list of database block addresses in the list.

15. A system comprising:

a list of addresses of blocks newly created during splitting of a primary B+tree;

a count of database block addresses in the list; and a ratio of count of database block addresses to total number of leaf blocks as a measure of invalid guess-database block addresses.

16. The system according to claim 15, wherein the database index is a primary B+tree structure, wherein the system further comprises:

a mapping table used to support bitmap indexes.

17. The system according to claim 16, further comprising:

a bitmap index supported by the mapping table.

18. The system according to claim 15, wherein the database index is a primary B+tree structure, wherein the system further comprises:

a secondary index structure comprising hybrid row identifiers.

19. A computer program product for performing a process for maintaining a database management system, comprising:

a computer readable medium; and computer program instructions, recorded on the computer readable medium, executable by a processor, for performing the steps of:

during splitting of a leaf block of a primary B+tree recording an address of a newly created leaf block;

maintaining the address of the newly created leaf block in a list as part of primary B+tree metadata; and maintaining a measure of invalid guess-database block addresses by calculating a ratio of a count of database block addresses in the list of new addresses to a total number of leaf blocks of the primary B+tree.

20. A system for performing a process for maintaining a database management system, comprising:

a processor operable to execute computer program instructions; and a memory operable to store computer program instructions executable by the processor, for performing the steps of:

during splitting of a leaf block of a primary B+tree recording an address of a newly created leaf block;

maintaining the address of the newly created leaf block in a list as part of primary B+tree metadata; and maintaining a measure of invalid guess-database block addresses by calculating a ratio of a count of database block addresses in the list of new addresses to a total number of leaf blocks of the primary B+tree.

21. The computer program product according to claim 19, wherein the measure of invalid guess-database block addresses applies to mapping table and secondary indexes on the primary B+tree.

22. The computer program product according to claim 19, wherein the list of database block addresses and the ratio are maintained only when the ratio is less than a threshold value.

23. The computer program product according to claim 22, wherein the threshold value for the ratio is about 10%.

24. The computer program product according to claim 21, further comprising:

adjusting a guess-DBA quality of at least one of the mapping table and the secondary index utilizing the ratio.

25. The computer program product according to claim 22, wherein if the ratio is below the threshold value the computer program product further comprises:

selectively correcting entries in the mapping table and/so secondary index.

26. The computer program product according to claim 25, wherein correcting entries in the mapping table comprises for all rows in a list of blocks in the primary B+tree:

obtaining corresponding mapping table row identifiers and database block addresses of a current block in the list;

sorting the corresponding mapping table row identifiers;

obtaining mapping table rows corresponding to the mapping table row identifiers; and updating a guress-DBA component if it has changed.

27. The computer program product according to claim 26, wherein the correcting is carried out on-line in a piece-wise manner.

28. The computer program product according to claim 22, wherein correcting entries in the secondary index comprises for all rows in a list of blocks in the primary B+tree:

obtaining a secondary index key, a primary key and a database block address of a current block in the list of blocks;

sorting the secondary index keys, primary keys and database addresses in order of (secondary index key, primary key) pairs;

obtaining an index row corresponding to the (secondary index key, primary key) pair; and updating a guess-DBA component of the index row if the guess-OBA has changed.

29. The computer program product according to claim 28, wherein the correcting is carried out on-line in a piece-wise manner.

30. The computer program product according to claim 22, wherein if the ratio is above the threshold value the computer program product further comprises:

correcting guess-database addresses on a per object basis.

31. The computer program product according to claim 30, wherein correcting guess-database block addresses on the mapping table comprises: performing a full scan of the mapping table;

determining for each row of the mapping table a correct guess-database block address by traversing the primary B+tree up to a penultimate level;

updating each row of the mapping table with the correct guess-database block address; and committing the correct guess-database address to the mapping table in batches.

32. The computer program product according to claim 30, wherein correcting guess-database block addresses on a per object basis comprises for each secondary index object:

performing a full scan of the secondary index object;

determining for each row of the secondary index a correct guess-database block address by traversing the primary B+tree up to a penultimate level;

updating each row of the secondary index with the correct guess-database block address; and committing the correct guess-database block address to the secondary index in batches.

33. The computer program product according to claim 19, further comprising:

maintaining a list of database block addresses in the list.

34. The system according to claim 20, wherein the measure of invalid guess-database block addresses applies to mapping tables and secondary indexes on the primary B+tree.

35. The system according to claim 20, wherein the list of database block addresses and the ratio are maintained only when the ratio is less than a threshold value.

36. The system according to claim 35, wherein the threshold value for the ratio is about 10%.

37. The system according to claim 34, further comprising:
adjusting a guess-DBA quality of at least one of the mapping table and the secondary index utilizing the ratio.

38. The system according to claim 35, wherein if the ratio is below the threshold value the system further comprises:
selectively correcting entries in the mapping table and/or secondary index.

39. The system according to claim 38, wherein correcting entries in the mapping table comprises for all rows in a list of blocks in the primary B+tree:
obtaining corresponding mapping table row identifiers and database block addresses of a current block in the list;
sorting the corresponding mapping table row identifiers;
obtaining mapping table rows corresponding to the mapping table row identifiers; and
updating a guess-DBA component if it has changed.

40. The system according to claim 39, wherein the correcting is carried out on-line in a piece-wise manner.

41. The system according to claim 35, wherein correcting entries in the secondary index comprises for all rows in a list of blocks in the primary B+tree:
obtaining a secondary index key, a primary key and a database block address of a current block in the list of blocks;
sorting the secondary index keys, primary keys and database addresses in order of (secondary index key, primary key) pairs;
obtaining an index row corresponding to the (secondary index key, primary key) pair; and
updating a guess-DBA component of the index row if the guess-DBA has changed.

42. The system according to claim 41, wherein the correcting is carried out on-line in a piece-wise manner.

43. The system according to claim 35, wherein if the ratio is above the threshold value the system further comprises:
correcting guess-database addresses on a per object basis.

44. The system according to claim 43, wherein correcting guess- database block addresses on the mapping table comprises:
performing a full scan of the mapping table;
determining for each row of the mapping table a correct guess-database block address by traversing the primary B+tree up to a penultimate level;
updating each row of the mapping table with the correct guess-database block address; and
committing the correct guess-database address to the mapping table in batches.

45. The system according to claim 43, wherein correcting guess- database block addresses on a per object basis comprises for each secondary index object:
performing a full scan of the secondary index object;
determining for each row of the secondary index a correct guess-database block address by traversing the primary B+tree up to a penultimate level;
updating each row of the secondary index with the correct guess-database block address; and
committing the correct guess-database block address to the secondary index in batches.

46. The system according to claim 20, further comprising:
maintaining a list of database block addresses in the list.

47. A method of maintaining a system for database management, the method comprising:
modifying a primary index in the database management system;
storing information relating to the modification of the primary index in a secondary index or a mapping table in the database management system; and
maintaining a measure of quality of the secondary index or the mapping table based on a ratio of information relating to the modification of the primary index to a size of the primary index.

48. The method of claim 47, wherein maintaining a measure of quality of the secondary index or a mapping table comprises calculating a ratio of the amount of information relating to the modification of the primary index in the secondary index or the mapping table to a size of the primary index.

49. The method of claim 47, wherein modifying the primary index comprises splitting a leaf block of the primary index.

50. The method of claim 49, wherein storing information relating to the modification of the primary index in a secondary index or a mapping table comprises storing an address of a leaf block created during the splitting of the leaf block of the primary index in the secondary index or the mapping table.

51. The method of claim 50, wherein maintaining a measure of quality of the secondary index or a mapping table comprises calculating a ratio of a number of addresses of leaf blocks created during the splitting of the leaf block of the primary index that are stored in the secondary index or the mapping table to a total number of leaf blocks in the primary index.

52. The method of claim 47, further comprising:
adjusting a quality of at least one of the secondary index or the mapping table utilizing the ratio.

53. The method of claim 47, wherein the ratio is maintained only when the ratio is less than a threshold value.

54. The method of claim 53, wherein the threshold value for the ratio is about 10%.

55. The method of claim 53, wherein if the ratio is below the threshold value the method further comprises:
selectively correcting the information in the secondary index or the mapping table.

56. A computer program product for performing a process for maintaining a database management system, comprising:
a computer readable medium; and
computer program instructions, recorded on the computer readable medium, executable by a processor, for performing the steps of:
modifying a primary index in the database management system;
storing information relating to the modification of the primary index in a secondary index or a mapping table in the database management system; and
maintaining a measure of quality of the secondary index or the mapping table based on a ratio of information relating to the modification of the primary index to a size of the primary index.

57. The computer program product of claim 56, wherein maintaining a measure of quality of the secondary index or a mapping table comprises calculating a ratio of the amount of information relating to the modification of the primary index in the secondary index or the mapping table to a size of the primary index.

58. The computer program product of claim 56, wherein modifying the primary index comprises splitting a leaf block of the primary index.

59. The computer program product of claim 58, wherein storing information relating to the modification of the primary index in a secondary index or a mapping table comprises storing an address of a leaf block created during the splitting of the leaf block of the primary index in the secondary index or the mapping table.

60. The computer program product of claim 59, wherein maintaining a measure of quality of the secondary index or a mapping table comprises calculating a ratio of a number of addresses of leaf blocks created during the splitting of the leaf block of the primary index that are stored in the secondary index or the mapping table to a total number of leaf blocks in the primary index.

61. The computer program product of claim 56, further comprising:

adjusting a quality of at least one of the secondary index or the mapping table utilizing the ratio.

62. The computer program product of claim 56, wherein the ratio is maintained only when the ratio is less than a threshold value.

63. The computer program product of claim 62, wherein the threshold value for the ratio is about 10%.

64. The computer program product of claim 62, wherein if the ratio is below the threshold value the computer program product further comprises:

selectively correcting the information in the secondary index or the mapping table.

65. A system for performing a process for maintaining a database management system, comprising:

a processor operable to execute computer program instructions; and a memory operable to store computer program instructions executable by the processor, for performing the steps of:

modifying a primary index in the database management system;

storing information relating to the modification of the primary index in a secondary index or a mapping table in the database management system; and maintaining a measure of quality of the secondary index or the mapping table based on a ratio of information relating to the modification of the primary index to a size of the primary index.

66. The system of claim 65, wherein maintaining a measure of quality of the secondary index or a mapping table comprises calculating a ratio of the amount of information relating to the modification of the primary index in the secondary index or the mapping table to a size of the primary index.

67. The system of claim 65, wherein modifying the primary index comprises splitting a leaf block of the primary index.

68. The system of claim 67, wherein storing information relating to the modification of the primary index in a secondary index or a mapping table comprises storing an address of a leaf block created during the splitting of the leaf block of the primary index in the secondary index or the mapping table.

69. The system of claim 68, wherein maintaining a measure of quality of the secondary index or a mapping table comprises calculating a ratio of a number of addresses of leaf blocks created during the splitting of the leaf block of the primary index that are stored in the secondary index or the mapping table to a total number of leaf blocks in the primary index.

70. The system of claim 65, further comprising:

adjusting a quality of at least one of the secondary index or the mapping table utilizing the ratio.

71. The system of claim 65, wherein the ratio is maintained only when the ratio is less than a threshold value.

72. The system of claim 71, wherein the threshold value for the ratio is about 10%.

73. The system of claim 71, wherein if the ratio is below the threshold value the system further comprises:

selectively correcting the information in the secondary index or the mapping table.

* * * * *